US009225601B2

(12) United States Patent
Khurshid et al.

(10) Patent No.: US 9,225,601 B2
(45) Date of Patent: Dec. 29, 2015

(54) NETWORK-WIDE VERIFICATION OF INVARIANTS

(71) Applicant: The Board of Trustees of the University of Illinois, Urbana, IL (US)

(72) Inventors: Ahmed Khurshid, Champaign, IL (US); Matthew Chapman Caesar, Buffalo Grove, IL (US); Philip Brighten Godfrey, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 192 days.

(21) Appl. No.: 13/919,670

(22) Filed: Jun. 17, 2013

(65) Prior Publication Data

US 2014/0369209 A1    Dec. 18, 2014

(51) Int. Cl.
*H04L 12/24* (2006.01)
(52) U.S. Cl.
CPC ........ *H04L 41/0893* (2013.01); *H04L 41/0866* (2013.01); *H04L 41/0869* (2013.01); *H04L 41/0873* (2013.01)

(58) Field of Classification Search
None
See application file for complete search history.

(56) References Cited

U.S. PATENT DOCUMENTS 6,611,499 B1 * 8/2003 D'Souza ........................ 370/252
8,595,794 B1 * 11/2013 Van ................................ 726/4
8,856,292 B2 * 10/2014 Srinivasan et al. ............ 709/221
2008/0181136 A1 * 7/2008 Watanabe et al. ............. 370/255
2014/0372579 A1 * 12/2014 Kikuchi et al. ................ 709/222

OTHER PUBLICATIONS

Zeng Cai, Design and Implementation of the Maestro Network Control Platform, Mar. 2009, pp. 1-77.*
Ahmed Khurshid, Wenxuan Zhou, Matthew Caesar, P. Brighten Godfrey, VeriFlow: Verifying Network-Wide Invariants in Real Time.*
Ehab Al-Shaer et al. "Network Configuration in A Box: Towards End-to-End Verification of Network Reachability and Security" Published in: 17th IEEE International Conference on Network Protocols, 2009. ICNP 2009. 10 pages.
Payman Kazemian et al. "Real Time Network Policy Checking using Header Space Analysis" Published in: Proceedings of the 10th USENIX on Networked Systems Design and Implementation, USENIX Association Berkeley, CA, USA 2013. 13 pages.

(Continued)

*Primary Examiner* — Christopher Crutchfield
(74) *Attorney, Agent, or Firm* — Lowenstein Sandler, LLP

(57) ABSTRACT

A network-wide verification system may be adapted with a data plane verification layer positioned between a set of multiple network devices and a controller in network communication with the devices, where the controller is configured to transmit packet-forwarding rules to the devices. The data plane verification layer monitors network rule modifications, such as monitoring modifications initiated by the network devices and/or by the controller, and verifies the validity of invariants of the monitored network according to multiple stored network invariants. The verification may be executed on parts of the network taking actions that are capable of being influenced by a new rule modification. The network invariants include conditions expected to be upheld in valid network operation as related to packet routing and the packet-forwarding rules.

25 Claims, 9 Drawing Sheets

(56) References Cited

OTHER PUBLICATIONS

Peyman Kazemian et al. "Header Space Analysis: Static Checking For Networks" Published in: Proceedings of the 9th USENIX conference on Network Systems Design and Implementation, USENIX Association Berkeley, CA, USA 2012. 14 pages.
Ehab Al-Shaer et al. "FlowChecker: Configuration Analysis and Verification of Federated OpenFlow Infrastructures" Published in: Proceedings of the 3rd ACM workshop on Assurable and usable security configuration, ACM New York, NY, USA 2010. 8 pages.
Ehab Al-Shaer et al. "ConfigChecker: A Tool for Comprehensive Security Configuration Analytics" Published in: 2011 4th Symposium on Configuration Analytics and Automation (SAFECONFIG). 2 pages.
"NetAPT Network Access Policy Tool for Verification of Distributed and Layered Security Policy Implementation," www.perform.csl.illinois.edu/netapt/index.html, Updated Feb. 27, 2013. 4 pages.
Security Wizardry "Firewall Rule Editors and Testing," www.securitywizardry.com/index.php/products/firewalls/firewall-rule-editors-and-testers.html. Modified Apr. 17, 2012. 4 pages.
Haohui Mai et al. "Debugging the Data Plane with Anteater" Published in: Proceedings of the ACM SIGCOMM 2011 conference, ACM New York, NY, USA 2011. 12 Pages.
Ahmed Khurshid et al. "Veriflow: Verifying Network-Wide Invariants in Real Time" Published in: Proceedings of the first workshop on Hot topics in software defined networks, ACM New York, NY, USA 2012. 6 pages.
Ahmed Khurshid et al. "Veriflow: Verifying Network-Wide Invariants in Real Time" Published in: *Symposium on Networked Systems Design and Implementation* (*NSDI*), Apr. 2013. 13 pages.
Zheng Cai et al. "Maestro: A System for Scalable OpenFlow Control" Published in: *Rice University Technical Report TR10-08*, Dec. 2010. 10 pages.
Marco Canini et al. "A NICE Way to Test OpenFlow Applications" Published in: Proceedings of the 9th USENIX conference on Networked Systems Design and Implementation, USENIX Association Berkeley, CA, USA 2012. 14 pages.
Nick Feamster et al. "Detecting BGP Configuration Faults with Static Analysis," Published in: 2nd Symposium on Networked Systems Design and Implementation, Boston, MA, May 2005. 14 pages.
Natasha Gude et al. "NOX: Towards an Operating System for Networks," Published in: ACM SIGCOMM Computer Communication Review, vol. 38, Issue 3, Jul. 2008. ACM New York, NY, USA. 6 pages.
John P. John et al. "Consensus Routing: The Internet as a Distributed System," Published in: Proceedings of the 5th USENIX Symposium on Networked Systems Design and Implementation, USENIX Association Berkeley, CA, USA, 2008. 14 pages.
Rick McGeer "A Safe, Efficient Update Protocol for OpenFlow Networks," Published in: Proceedings of the first workshop on Hot topics in software defined networks, ACM New York, NY, USA, 2012. 6 pages.
Nick McKeown et al. "OpenFlow: Enabling Innovation in Campus Networks," Published in: ACM SIGCOMM Computer Communication Review, vol. 38, Issue 2, Apr. 2008. ACM New York, NY, USA. 6 pages.
Sriram Natarajan et al. "Efficient Conflict Detection in Flow-Based Virtualized Networks," Published in: International Conference on Computing, Networking and Communications (ICNC) Maui, HI, 2012. 7 pages.
Phillip Porras et al. "A Security Enforcement Kernel for OpenFlow Networks," Published in: Proceedings of the first workshop on Hot topics in software defined networks, ACM New York, NY, USA, 2012. 6 pages.
Mark Reitblatt et al. "Abstractions for Network Update," Published in: Proceedings of the ACM SIGCOMM 2012 conference on Applications, technologies, architectures, and protocols for computer communication, ACM New York, NY, USA, 2012. 12 pages.
Rob Sherwood et al. "Can the Production Network Be the Testbed?" Published in: Proceedings of the 9th USENIX conference on Operating systems design and implementation, USENIX Association Berkeley, CA, USA, 2010. 14 pages.
Geoffrey G. Xie et al. "On Static Reachability Analysis of IP Networks," Published in: IEEE INFOCOM 2005 Proceedings. 14 pages.
Lihua Yuan et al. "FIREMAN: A Toolkit for FIREwall Modeling and ANalysis," Published in: 2006 IEEE Symposium on Security and Privacy, Berkeley, CA. 15 pages.
"OpenFlow Switch Specification" Version 1.1.0 Implemented (Wire Protocal 0x02), Feb. 28, 2011. 56 pages.
George Varghese, "Network Algorithmics: An Interdisciplinary Approach to Designing Fast" Published by: Elsevier/Morgan Kaufmann, San Francisco, CA. ISBN: 0-12-088477-1. Copyright 2005. pp. 278-284.
Mininet, "An Instant Virtual Network on your Laptop (or other PC)", http://web.archive.org/web/20130314002016/http://mininet.org/, Jun. 14, 2013.
Open vSwitch, "Production Quality, Multilayer Open Virtual Switch", http://web.archive.org/web/20110922225339/http://openvswitch.org/, Sep. 22, 2011. 2 pages.
Project Floodlight, "Floodlight," http://web.archive.org/web/20130613161031/http://www.projectfloodlight.org/floodlight/, Jun. 13, 2013. 3 pages.
OpenFlow, "Beacon," http://web.archive.org/web/20130731151048/https://openflow.stanford.edu/display/Beacon, Jul. 31, 2013. 4 pages.
NuSMV, "NuSMV: a new symbolic model checker," http://web.archive.org/web/20130114150840/http://nusmv.fbk.eu/, Jan. 14, 2013. 3 pages.
University of Washington, "Rocketfuel: An ISP Topology Mapping Engine," http://web.archive.org/web/20030813141610/http://www.cs.washington.edu/research/networking/rocketfuel/, Aug. 13, 2003. 2 pages.
University of Oregon, "Route Views Project," http://www.routeviews.org/, Published Jan. 27, 2005. 4 pages.

\* cited by examiner

NETWORK-WIDE VERIFICATION OF INVARIANTS

FEDERALLY SPONSORED RESEARCH

This invention was made with Government support under NSF Grant CNS 1040396 and CNS 1053781 by the National Science Foundation; and by the National Security Agency (NSA) and United States Army under UFAS No. A07514, University of Illinois at Urbana-Champaign (UIUC) Science of Security Lablet: Security through Resiliency. The United States Government has certain rights in the invention.

TECHNICAL FIELD

The present disclosure relates to the verification of conditions or invariants of a network, and more specifically, to performing such verification both offline and in real time in a network that includes multiple heterogeneous devices and protocols.

BACKGROUND

The world depends on computer networks for business tools, government applications, and individual necessities and interests, so that the overwhelming majority desires to keep these networks secured and running. The increasing complexity and scale of modern computer networks, however, has far outpaced the development of tools to manage their operation. A significant fraction of the human time and cost of operating networks is devoted to finding and diagnosing problems, yet numerous vulnerabilities and other bugs still go undetected. These bugs lead to loss of service, performance degradation, unauthorized intrusions, potential leakage of sensitive information, and many other problems. Eliminating all such problems is challenging: the scale, diversity, and dynamic nature of deployed networks means dealing with all potential interactions of heterogeneous devices and protocols is complex and becoming ever more complicated.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

DETAILED DESCRIPTION

Figure 1A:
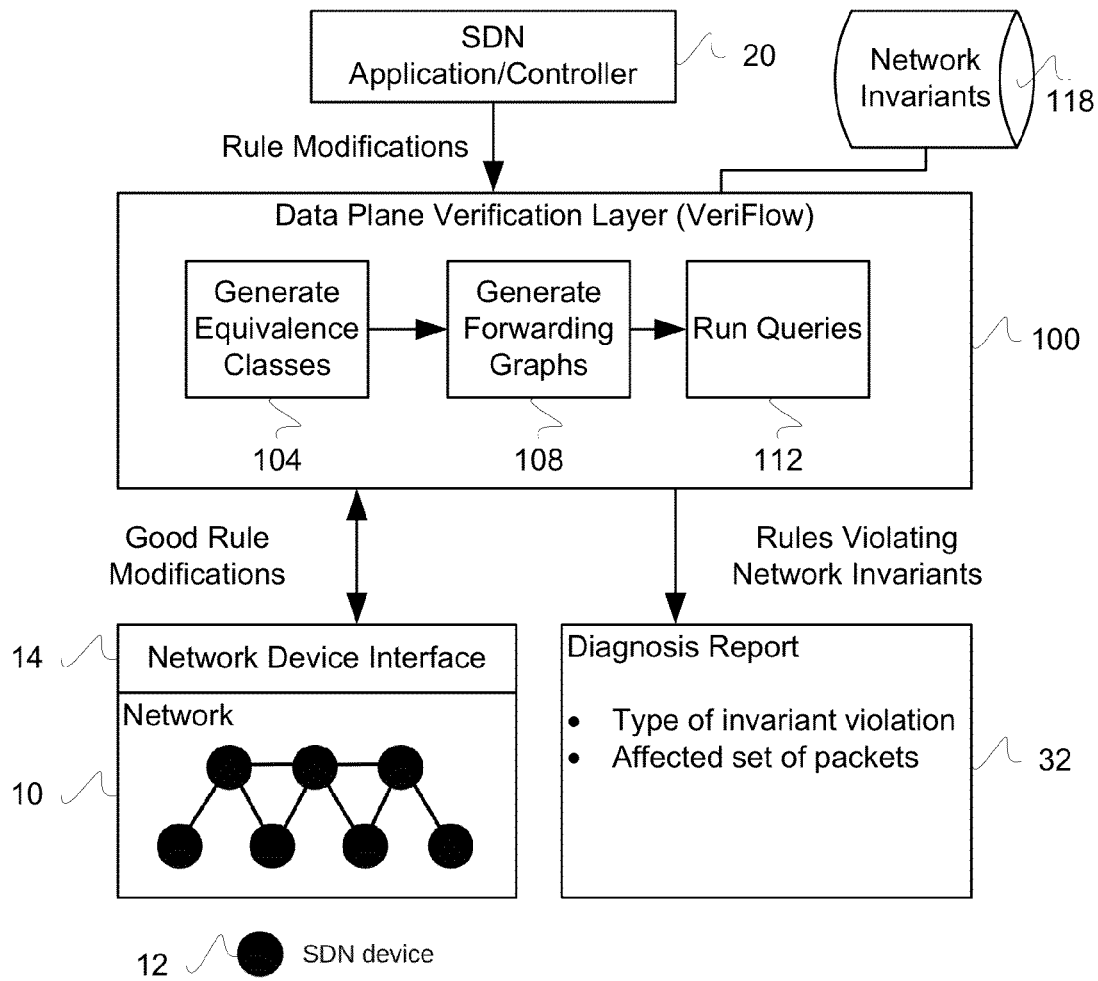
FIGS. 1A and 1B are, respectively, (A) a network diagram showing the interposition of a data plane verification layer between a network controller and forwarding devices of a network; and (B) a flow graph showing data flow to and operation of the network verification layer.

By way of introduction, the present disclosure relates in part to a network-wide verification system adapted with a data plane verification layer positioned between an interface to multiple network devices and a controller in network communication with devices, where the controller is configured to transmit commands to the devices, the commands including or consisting of packet-forwarding rules. A packet-forwarding rule may be an instruction appearing in a network device (such as a router, switch, firewall, network interface card, or other device) that specifies what actions the device should take upon receipt of a packet of a certain type, potentially including but not limited to modifying the packet, delivering it to software on the current device, forwarding it to another device, or discarding the packet (e.g., dropping the packet). The data plane verification layer monitors network rule modifications, such as monitoring routing activities of the network devices and the packet-forwarding rules of the controller, and verifies the validity of invariants of the monitored network according to multiple stored network invariants. The verification may be executed on parts of the network influenced by a new rule modification. This influenced part of the network may potentially include a reduced set of devices or a reduced set of packet-forwarding rules, relative to the network as a whole. The verification layer may also be used for "offline" verification by downloading forwarding rules from all devices and checking all parts of the network, rather than performing verification corresponding to each rule modification individually. The network invariants are conditions and states expected to be upheld in valid network operations as determined by the combined effect of packet-forwarding rules across multiple devices.

Packet forwarding in modern networks is a complex process, involving codependent functions running on hundreds or thousands of devices, such as routers, switches, and firewalls from different vendors. As a result, a substantial amount of effort is required to ensure networks' correctness, security and fault tolerance. Faults in the network state, however, arise commonly in practice, including loops, suboptimal routing, black holes (e.g., locations which inappropriately discard packets) and access control violations that make services unavailable or prone to attacks, e.g., distributed denial of service (DDoS) attacks. Software-defined networking (SDN) seeks to ease the development of network applications through logically-centralized network programmability via an open interface to the data plane, but bugs are likely to remain problematic since the complexity of software will increase. Moreover, SDN allows multiple applications or even multiple users to program the same physical network simultaneously, potentially resulting in conflicting rules that alter the intended behavior of one or more applications.

One solution is to rigorously check network software or configuration for bugs prior to deployment. Symbolic execution can catch bugs through exploration of all possible code paths, but is usually not tractable for large software. Analysis of configuration files is useful, but cannot find bugs in router software, and is designed for specific configuration languages and control protocols. Moreover, in using these approaches, an operator who wants to ensure the correctness of a network must have access to the software and configuration, which may be inconvenient in an SDN network where third parties other than the operator may operate controllers. Another approach is to statically analyze snapshots of the network-wide data-plane state. These previous approaches, however, operate offline and thus only find bugs after they happen.

Figure 1B:
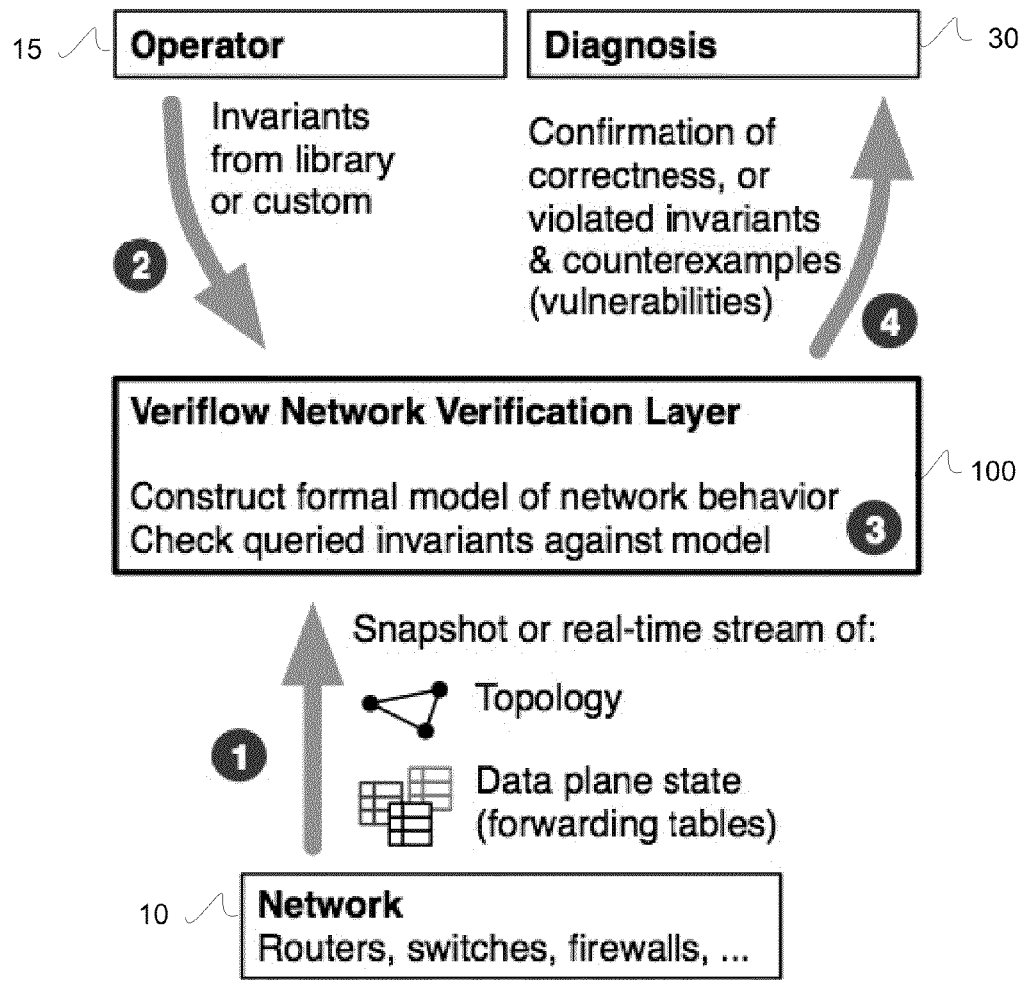

FIGS. 1A and 1B are, respectively, (A) a network diagram showing the interposition of a data plane verification layer 100 between a network controller 20 and forwarding devices 12 of a network 10; and (B) a flow graph showing data flow to and operation of the network verification layer 100. The data plane verification layer 100 (also referred to as VeriFlow or simply "verification layer") may be positioned between an application or network controller 20 and the network devices 12 that forward data packets such as routers, switches, hubs and the like. The network controller 20 may be in network communication with a network device interface 14 of the network 10 and configured to transmit routing commands or packet-forwarding rules in real time to the network devices 12. The verification layer 100 may be coupled with or include computer storage 118 in which is stored network invariants or conditions that define proper network operation.

The data plane verification layer 100 may therefore obtain rule modifications from the controller 20 and send the rule modifications for execution by network devices 12 impacted by the rule modifications, but only after verifying proper operation of the network according to the network invariants if the rule modifications were to be sent to devices for adoption. A rule modification may include a new rule, the deletion of a rule, or a revision or update to an existing rule. If any of the rule modifications violate conditions or network invariants of the network, then a diagnosis report 32 may be generated that includes the type of invariant violation and a set of packets affected by the violation. An invariant may include a condition or state expected to be upheld in valid network operation as set by an operator or by third party controllers. More specifically, an invariant may include a condition regarding packet-forwarding behavior in the data plane of a network, where the packet-forwarding behavior is either true or false for a given network at a certain moment in time.

The data plane verification layer 100 may perform various processing steps to perform verification, which may include but not be limited to generating equivalence classes (104), generating forwarding graphs (108) and running queries (112) or data traces to perform the verification on the forwarding graphs. These steps will be discussed in more detail below.

To perform these steps, as indicated in FIG. 1B, the verification layer 100 may receive a snapshot or a real-time stream of topology of the network and data plane state such as from forwarding tables (step 1). The verification layer 100 may also receive, from an operator 15, network invariants that are derived from a library or are custom-built invariants (step 2). The verification layer 100 may then construct a formal model of network behavior and check queried invariants against the model (step 3). The verification layer 100 may ultimately generate a diagnosis or confirmation of the correctness of the network operation on the one hand or a report of the violated invariants and counterexamples on the other hand, which violations may indicate conditions in the network such as bugs, security vulnerabilities, or other properties of interest to the network operator (step 4).

As will be explained in more detail, the design of the verification layer 100 implementation demonstrates that the goal of real-time verification of network-wide invariants is achievable. The verification layer 100 leverages software-defined networking (SDN) to obtain a picture of the network 10 as it evolves by sitting as a layer between the SDN controller 20 and the network devices in the network device interface 14, and checks validity of invariants as each rule is inserted, modified or deleted. SDN alone, however, does not make the problem easy. In order to ensure real-time response, incremental algorithms are proposed to search for potential violation of key network invariants. Violations may include, but not be limited to, availability of a path to a destination, absence of forwarding loops, enforcement of access control policies, or isolation between virtual networks.

The design prototype of the verification layer 100 supports both OpenFlow version 1.1.0 and Internet Protocol (IP) forwarding rules. The verification layer was micro-benchmarked using a stream of updates from a simulated IP network, constructed with network topology data from the University of Washington's Rocketfuel project and real border gateway protocol (BGP) message traces from the University of Oregon's Route Views project. The overhead of the verification layer relative to the NOX controller (software as described in "NOX: Towards an operating system for networks," by N. Gude et al in *SIGCOW Computer Communication Review*, 2008) in an emulated OpenFlow network was evaluated using the Mininet network emulation software from Stanford University. The present verification layer 100 implementation was able to verify network-wide invariants within hundreds of microseconds as new rules are introduced into the network 10. The verification phase has little impact on network performance and inflates TCP connection setup latency by a manageable amount, around 15.5% on average.

Verifying network correctness in the data plane offers several advantages over verifying higher-level code such as configuration files. First, such verification is closely tied to actual behavior of a network, so that the verification layer can catch bugs that other tools miss. For example, configuration analysis cannot find bugs that occur in router software. Second, because data-plane state has relatively simple formats and semantics that are common across many higher-layer protocols and implementations, such verification simplifies rigorous analysis of a network.

The verification layer 100 may perform real-time data plane verification in the context of software-defined networks (SDNs). The network 10 may therefore be or be incorporated within an SDN. An SDN includes, at a high level, (1) a standardized and open interface 14 to read and write the data plane of network devices 12 such as switches and routers; and (2) the controller 20, a logically centralized device that can run custom code and is responsible for transmitting packet-forwarding rules to network devices.

SDNs may be a good match for data plane verification. First, a standardized data plane interface such as OpenFlow simplifies unified analysis across all network devices. Second, SDNs ease real-time data plane verification because the stream of updates to the network is observable at the controller. Verification on the SDN thus simplifies the verification layer 100 design (VeriFlow). Moreover, SDNs can benefit significantly from the data plane verification layer: the network operator 15 can verify that the network's forwarding behavior is correct, without needing to inspect (or trust) relatively complex controller code, which may be developed by parties outside the control of the network operator.

Checking network-wide invariants in the presence of complex forwarding elements can be a hard problem. For example, packet filters alone make reachability checks NP-Complete. Aiming to perform these checks in real-time is therefore challenging. The present implementation of the verification layer 100 therefore may first monitor all the network update events in a live network as the network control applications, the devices, and/or the network operator generate the network update events. Second, the design may confine verification activities to only those parts of the network whose actions may be influenced by a new update. Third, rather than checking invariants with a general-purpose tool such as a satisfiability (SAT) or binary decision diagram (BDD) solver, the verification layer design may employ a custom algorithm.

The verification layer may track forwarding-state change events. For example, in an SDN such as an OpenFlow-based network, a centralized controller may issue packet-forwarding rules (including rule modifications) to the network devices 12 to handle flows initiated by users. The verification layer 100 may obtain these rules (by being sent the rules, intercepting them, or otherwise receiving them), and verifies the rules before the rules reach the network. To do so, the present verification layer may be implemented as a "shim" layer between the controller and the network, and monitors communications in either direction.

For every rule insertion/deletion message, the verification layer 100 may verify the effect of the rule on the network at high speeds. Unlike previous solutions, the verification layer 100 may not check the entire network on each change, but may perform verifications updates in three steps as follows.

Figure 2:
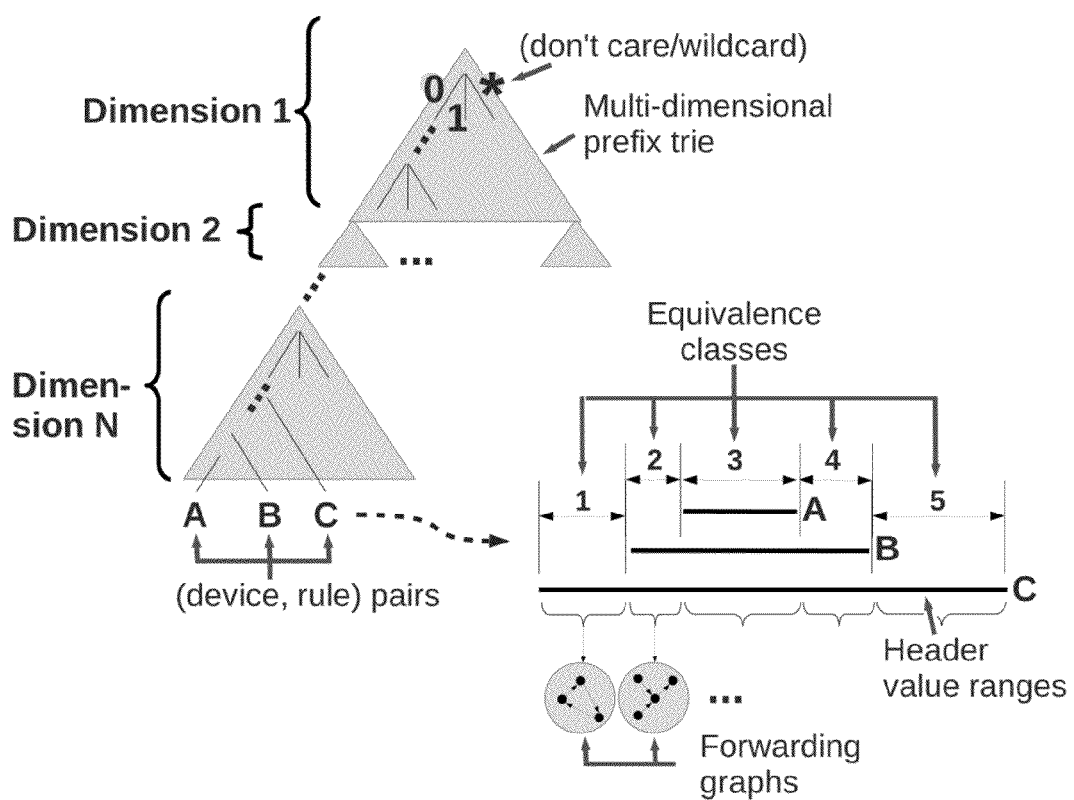
FIG. 2 is a flow chart and corresponding diagrams showing core algorithmic processes of the data plane verification layer of FIGS. 1A and 1B.

First, using a rule modification and any overlapping existing rules, the verification layer 100 may slice the network into a set of equivalence classes (ECs) of packets (FIG. 2). Each EC is a set of packets that experience or could experience the same forwarding actions throughout the network. Each change to the network typically only affects a small number of ECs. Therefore, for real-time verification, the verification layer may execute an EC selection procedure, which finds the set of ECs whose operation could be altered by a rule modification, and may verify network invariants only within those classes. The verification layer may also be used in "offline" mode to check the entire network by having the EC selection procedure select all ECs, or a certain subset of ECs as specified by a configurable parameter. Second, the verification layer may build individual forwarding graphs for each modified EC, where a forwarding graph includes a representation of how packets within the EC may flow through the network 10. Third, the verification layer may traverse these graphs (or run custom user-defined code) to determine the status of one or more invariants, e.g., whether the invariant(s) are violated as they traverse a graph affected by a modified EC.

One way to verify network properties is to prepare a model of the entire network using its current data-plane state, and run queries on this model. Checking the entire network's state every time a new rule modification is inserted is wasteful, and fails to provide real-time response. Most forwarding rule changes affect only a small subset of all possible packets. For example, inserting a longest-prefix-match rule for the destination IP field may only affect forwarding for packets destined to that specified IP address prefix. In order to confine its verification activities to only the affected set of packets, its verification layer slices the network into a set of equivalence classes (ECs) based on the rule modification and the existing rules that overlap with the rule modification. An equivalence class (EC) may be a set P of packets such that for any $p_1, p_2 \in P$ and network device R, the forwarding action is identical for $p_1$ and $p_2$ at R.

Separating the entire packet space into individual ECs allows the verification layer to pinpoint the affected set of packets if a problem is discovered while verifying a newly inserted or modified packet-forwarding rule.

For example, consider an OpenFlow switch with two rules matching packets with destination IP address prefixes 11.1.0.0/16 and 12.1.0.0/16, respectively. If a new rule matching destination IP address prefix 11.0.0.0/8 is added, it may affect packets belonging to the 11.1.0.0/16 range depending on the rules' priority values (the longer prefix may not have higher priority). The new rule, however, will not affect packets outside the range 11.0.0.0/8, such as 12.1.0.0/16. Therefore, the verification layer only considers the new rule (11.0.0.0/8) and the existing overlapping rule (11.1.0.0/16) while analyzing network properties. These two overlapping rules produce three ECs (represented using the lower and upper bound range values of the destination IP address field): 11.0.0.0 to 11.0.255.255, 11.1.0.0 to 11.1.255.255, and 11.2.255.255 to 11.255.255.255.

The verification layer 100 may employ an efficient data structure to quickly store modified network rules, find overlapping rules, and compute the affected ECs. The data structure utilized may be a multi-dimensional prefix tree (trie) inspired by traditional packet classification algorithms. See FIG. 2. A trie may be an ordered tree data structure that stores an associative array. Here, the trie associates the set of packets matched by a packet-forwarding rule with the packet-forwarding rule itself. Each level in the trie corresponds to a specific bit in a forwarding rule (equivalently, a bit in the packet header).

As shown in FIG. 2, each node in a trie may include three branches corresponding to three possible values that the rule can match: 0, 1, and * (wildcard). The trie may be seen as a composition of several sub-tries or dimensions, each corresponding to a packet header field. The verification layer maintains a set of sub-tries in the multi-dimensional trie for each of the mandatory match and packet header fields supported by the network devices in question. An optimization in the present implementation, which supports OpenFlow 1.1.0 devices, may use a condensed set of fields in the trie. For example, the sub-trie representing the IPv4 destination corresponds to 32 levels in the trie. One of the sub-tries (DL_SRC in the present design) appears at the top, and the next field's sub-tries are attached to the leaves of the first, and so on. A path from the trie's root to a leaf of one of the bottommost sub-tries thus represents the set of packets that a rule matches. Each leaf stores the rules that match that set of packets, and the devices at which they are located.

The verification layer may execute an equivalence class selection procedure to determine what parts of the network to verify. For "offline" verification of the network, the verification layer can verify the entire network by having the procedure select all ECs, or a certain subset of ECs as specified by a configurable parameter. For real-time verification, when a packet-forwarding rule modification is received, EC selection procedure may find a reduced set of ECs, as follows. The procedure performs a lookup in the trie, by traversing it dimension by dimension, to find all the rules that intersect the new rule. At each dimension, the procedure narrows down the search area by only traversing those branches that fall within the range of the modified rule using the field value of that particular dimension. The lookup routine results in the selection of a set of leaves of the bottommost dimension, each with a set of packet-forwarding rules. These rules collectively define a set of packets (in particular, their corresponding packet-forwarding rules) that could be affected by the incoming packet-forwarding rule. This set may span multiple ECs. The procedure may next compute the individual ECs as illustrated in FIG. 2. For each field, the procedure finds a set of disjoint ranges (lower and upper bound) such that no rule splits one of the ranges. An EC may then be defined by a particular choice of one of the ranges for each of the fields. This is not necessarily a minimal set of ECs; for example, ECs 2 and 4 in FIG. 2 could have been combined into a single EC. This method performs well in practice.

For each EC computed by the equivalence class selection procedure in the previous step, the verification layer 100 may build a forwarding graph. Each such graph is a representation of how packets within an EC will flow through devices in the network. In the graph, a node represents an EC at a particular network device, and a directed edge represents a forwarding decision for a particular (EC, device) pair. Specifically, an edge X→Y indicates that according to the forwarding table at node X, packets within this EC are forwarded to Y.

To build the graph for each EC, the verification layer 100 may traverse the trie a second time to find the devices and rules that match packets from that EC. The second traversal, accordingly, finds rules that were not necessary to compute the affected ECs in the first traversal, yet can still influence the forwarding behavior of the network devices. For example, for a new rule with 10.0.0.0/8 specified as the destination prefix, an existing 0.0.0.0/0 rule may not contribute to the generation of the affected ECs, but may influence forwarding behavior depending on its priority. Given the range values of different fields of an EC, looking up matching rules from the trie structure can be performed very quickly. Here, the verification layer traverses those branches of the trie having rules that may match packets of that particular EC.

The verification layer 100 may maintain a list of invariants to be checked, e.g., as stored in the computer storage 118. When ECs have been modified, the verification layer 100 may check each (invariant, modified EC) pair. An invariant may be specified as a verification function that takes as input the forwarding graph for a specific EC, performs arbitrary computation, and can trigger resulting actions. The verification layer may expose an application programming interface (API), the implementation of which is described below, so that new invariants may be written and plugged in.

Up to a certain level of detail, the forwarding graph may be an exact representation of the forwarding behavior of the network 10. Therefore, invariant modules may check a large diversity of conditions concerning network behavior. The following are a few examples of such network behavior that can be verified.

Basic Reachability:
The verification function traverses the directed edges in the forwarding graph (using depth-first search in our implementation) to determine whether packets will be delivered to the destination address specified in the rule.

Loop-Freeness:
The verification function traverses the given EC's forwarding graph to check that it does not contain a loop.

Consistency:
Given two (pre-specified) routers $R_1$, $R_2$ that are intended to have identical forwarding operations, the verification function traverses the forwarding graph starting at $R_1$ and $R_2$ to test whether the fate of packets is the same in both cases. (Any difference may indicate a bug.)

Further examples may include but not be limited to: detecting black holes where packets are dropped; ensuring isolation of multiple virtual local area networks (VLANs); verifying access control policies; checking whether a new rule conflicts with an existing rule; checking whether an EC changes its forwarding behavior due to the modification of a rule; ensuring that packets always traverse a firewall; and the like.

If a verification function finds a violated invariant, the verification layer can choose to trigger further actions within the network. For example, the verification layer may perform one or a combination of: (i) dropping the packet-forwarding rule that violates an invariant; (ii) generating an alarm for a network operator; (iii) logging events that occur for performing statistical analysis of network behavior; and (iv) executing a customized function or program configured as a parameter to the data plane verification layer. (The configurable parameter may be comparable to, but not the same as, adapting a web browser to allow users to install a module such as to allow display of an unusual type of file.) The operator could choose to drop rules that cause a security violation (such as packets leaking onto a protected VLAN), but only generate an alarm for a black hole. As verification functions may be customized functions or programs, the verification functions may take other actions as well, such as maintaining statistics (e.g., rate of forwarding behavior change), writing to logs that aggregate data for purposes of performing statistical analysis on the aggregated data, or generating an SMS text message to be sent to an operator's cell phone.

The verification layer 100 may achieve real-time response by confining its verification activities within those parts of the network that are affected when a new packet-forwarding rule is installed. In general, the effectiveness of this approach may be determined by numerous factors, such as by the complexity of verification functions, the size of the network, the number of rules in the network, the number of unique ECs covered by a new rule, the number of header fields used to match packets by a new rule, and so on.

A particularly influential factor summarizing verification time is the number of ECs that are modified. As experiments show, the verification layer's verification time may be roughly linear in this number. In other words, the verification layer has difficulty verifying invariants in real-time when large swaths of the network's forwarding behavior are altered in one operation.

When such disruptive events occur, the verification layer 100 may need to let new rules be installed in the network without waiting for verification, and run the verification process in parallel. This approach loses the ability to block problematic rules before entering the network, but there are several mitigating facts. First, the most prominent example of a disruptive event affecting many ECs may be a link failure, in which case the verification layer cannot block the modification from entering the network. Second, upon (eventually) detecting a problem, the verification layer may still raise an alarm and remove the problematic rule(s) from the network. Third, the fact that the number of affected ECs is large may itself be worthy of an immediate alarm even before invariants are checked for each EC. Finally, experiments with realistic packet-forwarding-rule-update traces show that disruptive events (e.g., events affecting large number of ECs) are rare: in the vast majority of cases (around 99%), the number of affected ECs is small (less than 10 ECs).

In order to ease the deployment of the data plane verification layer 100 in networks 10 with OpenFlow-enabled devices, and to use the verification layer with unmodified OpenFlow applications, we need a mechanism to make the verification layer transparent so that these existing OpenFlow entities may remain unaware of the presence of VeriFlow. The inventors built two versions of the verification layer. One is a proxy process that sits between the controller and the network, and is therefore independent of the particular controller. The second version is integrated with the NOX OpenFlow controller to improve performance; the included performance evaluation is of this latter version. One could similarly integrate the verification layer with other controllers without significant trouble.

The inventors built an implementation within NOX version 0.9.1 (full beta single-thread version). The implementation integrates the verification layer within NOX, enabling it to run as a transparent rule verifier sitting between the OpenFlow applications implemented using NOX's API, and the switches and routers in the network. SDN applications running on NOX use the NOX API to manipulate the forwarding state of the network, resulting in OFPT_FLOW_MOD (flow table modification) and other OpenFlow messages generated by NOX. The inventors modified NOX to intercept these messages, and redirect them to the network verification layer 100 (VeriFlow). This ensures that the verification layer intercepts the messages before they are dispatched to the network. The verification layer may then process and check the packet-forwarding rules contained in these messages for correctness, and block problematic flow rules.

To integrate the verification layer 100, the inventors extended two parts of NOX. First, within the core of NOX, the send_openflow_command( ) interface is responsible for adding (relaying) flow rules from OpenFlow applications to the switches. At the lower layers of NOX, handle_flow_removed( ) handles events that remove rules from switches, due to rule timeouts or commands sent by applications. The present implementation intercepts all messages sent to these two function calls, and redirects them to the verification layer. To reduce memory usage and improve running time, the verification layer passes these messages via shallow copy.

There are five types of flow table modification messages that may be generated by OpenFlow applications: OFPFC_ADD, OFPFC_MODIFY_STRICT, OFPFC_DELETE_STRICT, OFPFC_MODIFY and OFPFC_DELETE. These rules differ in terms of whether they add, modify or delete a rule from the flow table. The strict versions match all the fields bit by bit, whereas the non-strict versions allow wildcards. The verification layer 100 handles all these message types appropriately.

As discussed, the verification layer 100 may maintain a multi-dimensional trie data structure to store all the packet-forwarding rules present in all the devices in the network. Use of tries enables the verification layer to quickly look up the existing rules that overlap with a newly inserted modified rule. The trie structure also allows the verification layer to handle the wildcards efficiently. The verification layer may consider each rule as a binary string of bits representing the packets that get matched by that rule. The verification layer may use the individual bits to prepare the trie. Each level in the trie may correspond to a single bit in a rule. For example, for IPv4 destination prefix-based forwarding rules, there are 32 levels in the trie. Each node in the trie may have three branches—the first branch may be taken when the corresponding rule bit is 0, the second is taken when the bit is 1, and the third may be taken when the bit is don't care (e.g., a wildcard). The leaves of the upper layer tries store pointers to the tries of the next lower layer/dimension. The leaves of the tries, which represent the last dimension, store the actual rules that are represented by the path that leads to a particular leaf, starting from the root of the first trie (DL_SRC) (FIG. 2).

The verification layer 100 may use an optimization technique that exploits the way certain match and packet header fields are handled in the OpenFlow 1.1.0 specification. Ten (10) out of 14 fields in this specification may not support arbitrary wildcards. One may only specify an exact value or the special ANY (wildcard) value in these fields. The verification layer may not use separate dimensions in the trie to represent these fields, because the verification layer may not need to find multiple overlapping ranges for these fields. Therefore, the verification layer may maintain the trie structure for the other four fields (DL_SRC, DL_DST, NW_SRC and NW_DST).

Due to this change, the verification layer 100 may generate the set of affected equivalence classes (ECs) in the equivalence class selection procedure in three steps. First, the verification layer may use the trie structure to look for network-wide overlapping rules, and to find the set of affected packets determined by the four fields that are represented by the trie. Each individual packet set the verification layer gets from this step may be a set of ECs that can be distinguished by the other 10 fields. Second, for each of these packet sets, the verification layer may extract the rules that match packets of that particular class from the location/device of the newly inserted modified rule. The verification layer may go through these rules linearly to find non-overlapping range values for the rest of the fields that are not maintained in the trie structure. Thus, each packet set found in the first step breaks into multiple finer packet sets spanning the 14 mandatory OpenFlow match and packet header fields. Note that, in this step, the verification layer may only consider the rules present at the device of the newly inserted modified rule. Therefore, in the final step, as the verification layer traverses the forwarding graphs, the verification layer may encounter finer rules at other devices that may generate new packet sets with finer granularity. The verification layer may handle these rules by maintaining sets of excluded packets as described in the next paragraph.

Each forwarding graph that is generated using the trie structure represents the forwarding state of a group of packet sets that can be distinguished using the 10 fields that do not support arbitrary wildcards. Therefore, while traversing the forwarding graphs, the verification layer may only work on those rules that overlap with the newly inserted modified rule on these 10 fields. As the verification layer moves from node to node while traversing these graphs, the verification layer keeps track of the ECs that have been served by finer rules and may no longer be present in the primary packet set that was generated in the first place. For example, in a device, a subset of a packet set may be served by a finer rule having higher priority than a coarser rule that serves the rest of that packet set. The verification layer may handle this by maintaining a set of excluded packets for each forwarding action. Therefore, whenever the verification layer reaches a node that answers a query (e.g., found a loop or reached a destination), the primary packet set minus the set of excluded packets may result in the set of packets that experiences the result of the query.

By building the trie structure, the verification layer may be facilitated in searching for overlapping rules, which may become extremely fast. Given a new modified rule, the verification layer may start with the first bit of the rule and traverse the trie starting from its root. The verification layer may examine each bit and take the branch to which the bit value points. For "don't care bits," the verification layer explores all the branches of the current node, as "a don't care bit" can take any value. For the 0 (or, 1) bit, the verification layer may explore only the 0 (or, 1) branch. Once the verification layer reaches the leaves of all the paths that the verification layer explores in the bottom-most tries, the verification layer gets a list of rules that are within the range of the modified rule. The verification layer may use these rules to construct the equivalence classes and forwarding graphs that may be used for verifying network properties.

The verification layer 100 may expose a set of functions that can be used to write general queries in C++. Below is a list of these functions along with respective parameters.

GetAffectedEquivalenceClasses: Given a new rule, this function may compute the set of affected ECs, and may return them. This function may also return a set of sub-tries from the last dimension of the trie structure. Each sub-trie may hold the rules that can match packets belonging to one of the affected ECs. This information may be used to build the forwarding graphs of those ECs. This function may take the following non-exclusive list of parameters.

Rule: A newly inserted or modified rule.
Returns: Affected ECs.
Returns: Sub-tries representing the last dimension, and holding rules that can match packets of the affected ECs.
GetForwardingGraph: This function may generate and return the forwarding graph for a particular EC. This function may take the following non-exclusive list of parameters.
EquivalenceClass: An EC whose forwarding graph will be computed.
TrieSet: Sub-tries representing the last dimension, and holding rules that match the EC supplied as the first argument.
Returns: Corresponding forwarding graph.
ProcessCurrentHop: This function may allow the user to traverse a forwarding graph in a custom manner. Given a location and EC, this function may return the corresponding next hop. This function may handle the generation of multiple finer packet sets by computing excluded packet sets that need to be maintained because of the above-described optimization strategy. Due to this optimization, the ProcessCurrentHop function may return a set of (next hop, excluded packet set) tuples, which may be considered an annotated directed edge in the forwarding graph. With repeated calls to this function across nodes in the forwarding graphs, custom invariant-checking modules may traverse the forwarding graph and perform arbitrary or customized computation on its structure. This function may take the following non-exclusive list of parameters.

ForwardingGraph: The forwarding graph of an EC.
Location: The current location of the EC.
Returns: (Next hop, excluded packet set) tuples.

Consider an example that shows how this API may be used in practice. A network operator may want to ensure that packets belonging to a certain set always pass through a firewall device. This invariant can be violated during addition/deletion of rules, or during link up/down events. To check this invariant, the network operator may extend the verification layer 100 using the above-referenced API to incorporate a custom query algorithm that generates an alarm when the packet set under scrutiny bypasses the firewall device. In fact, the network operator can implement any query that can be answered using the information present in the forwarding graphs.

Evaluation—Verification Performance

As the verification layer 100 intercepts rule insertion messages whenever an SDN controller issues a message, the verification layer may complete the verification process in real time so that network performance is not affected, and to ensure scalability of the controller. The inventors evaluated the overhead of the verification layer's (VeriFlow's) operations with the help of two experiments. In the first experiment, the goal is to micro-benchmark different phases of the verification layer's operations and to observe the phases' contribution to the overall running time. The goal of the second experiment is to assess the impact of the verification layer on TCP connection setup latency and throughput as perceived by end users of an SDN.

In the experiments, the inventors used basic reachability algorithms to test for loops and black holes for every flow modification message that was sent to the network. All of the experiments were performed on a Dell OptiPlex 9010 machine with an Intel Core i7 3770 CPU with 4 physical cores and 8 threads at 3.4 GHz, and 32 GB of RAM, running 64 bit Ubuntu Linux 11.10.

First Experiment

In this experiment, the inventors simulated a network consisting of 172 routers following a Rocketfuel measurement of the topology of Autonomous System 1755, and replayed BGP (Border Gateway Protocol) RIB (Routing Information Base) and update traces collected from the Route Views Project. The inventors built an OSPF (Open Shortest Path First) simulator to compute the IGP (Interior Gateway Protocol) path cost between every pair of routers in the network. A BGP RIB snapshot consisting of 5 million entries was used to initialize the routers' FIB (Forwarding Information Base) tables. Only the FIBs of the border routers were initialized in this phase.

The inventors then randomly mapped Route Views peers to border routers in the experimental network, and then replayed RIB and update traces so that the traces originated according to this mapping. The inventors replayed a BGP update trace containing 90,000 updates to trigger dynamic changes in the network. Upon receiving an update from the neighboring AS, each border router sent the update to all the other routers in the network. Using standard BGP polices, each router updates its RIB using the information present in the update, and updates its FIB based on BGP AS path length and IGP path cost. The inventors fed all the FIB changes into the verification layer to measure the time the verification layer takes to complete its individual steps described earlier. The inventors then recorded the run time to process each change individually. Note that in this first set of experiments, only the destination IP address may be used to forward packets. Therefore, only this one field contributes to the generation of equivalence classes (ECs). The inventors initialized the other fields to ANY (or wildcards).

Figure 3A:
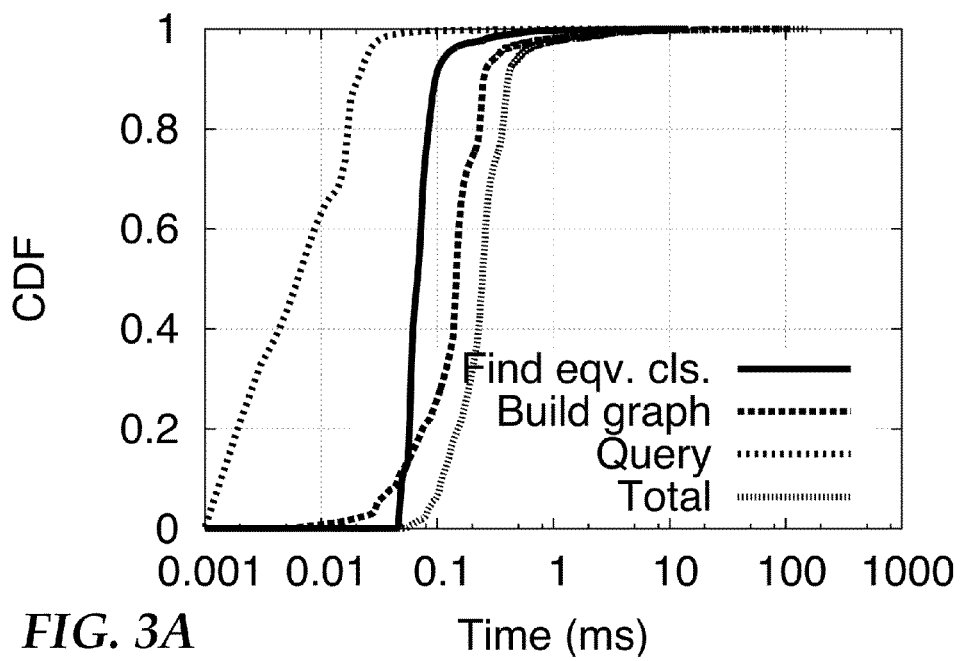
FIGS. 3A, 3B, 3C and 3D are graphs of experimental results from executing the data plane verification layer of FIGS. 1A and 1B, respectively: (A) micro-benchmark results, using a trace of packet-forwarding rule changes, where total verification time was below 1 (one) millisecond (ms) for 97.8% of the updates; (B) a scatter plot showing the influence of the number of equivalence classes on verification time; (C) results from a multi-field packet filter experiment using the trace of rule changes; and (D) results from a conflict detection test.

The results from this experiment are shown in FIG. 3A. The verification layer may be able to verify most of the updates within 1 millisecond (ms), with mean verification time of approximately 0.38 ms. Moreover, of this time, the query phase may take only about 0.01 ms on an average, demonstrating the value of reducing the query problem to a simple graph traversal for each EC. Therefore, the verification layer may be able to run multiple queries of interest to the network operator (e.g., black hole detection, isolation of multiple VLANs, etc.) within a millisecond time budget.

Figure 3B:
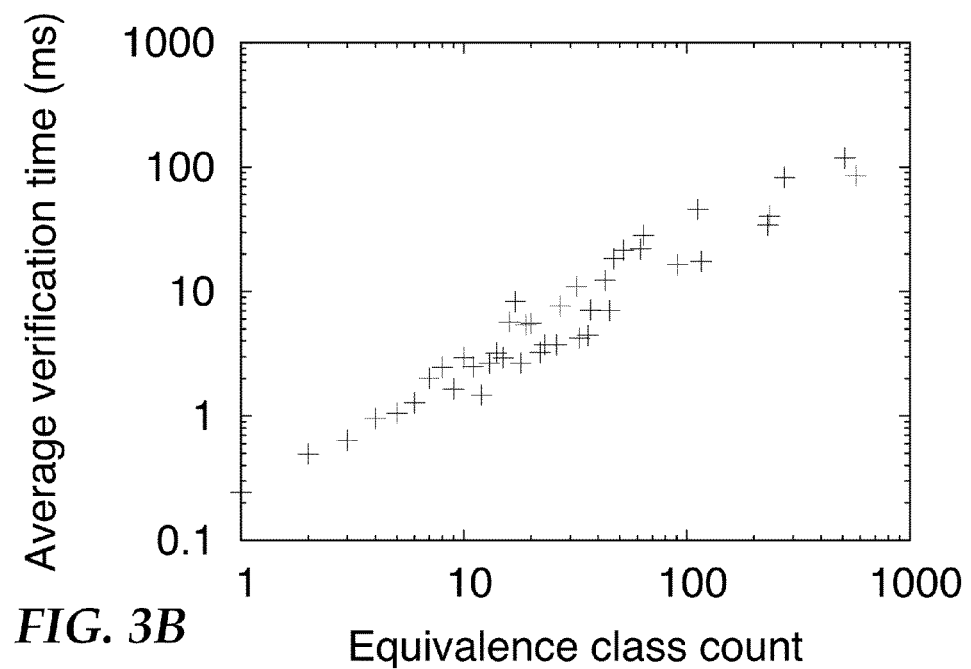

The results indicate that the number of ECs that are affected by a new rule strongly influences verification time. The scatter plot of FIG. 3B shows one data point for each observed number of modified ECs (showing the mean verification time across all rules, which modified that number of ECs). The largest number of ECs affected by a single rule was 574; and, the largest verification latency was 159.2 ms due to an update affecting 511 ECs. In this experiment, however, we found that for most updates the number of affected ECs is small: 94.5% of the updates only affected a single EC, and 99.1% affected less than 10 ECs. Therefore, only a small fraction of rules (0.9%) affected large numbers of ECs. This can be observed by looking at the long tail of the graph in FIG. 3B.

In the above experiment, the network topology remains unchanged, i.e., there are no link or node failures. In case of a link failure or node failure (which can be thought of as failure of multiple links connected to the failed node), the packets that were using that link or node will experience changes in their forwarding behavior. When this happens, the verification layer's job is to verify the fate of those affected packets. In order to evaluate the verification layer's performance in this scenario, the inventors used the above topology and traces to run a new experiment. In this experiment, the inventors fed both the BGP RIB trace and update trace to the network. Then each of the packet-carrying links (381 in total) of the network were removed one by one (restoring a removed link before removing the next), and the number of affected ECs and the running time of the verification layer were computed to verify the behavior of those classes. The inventors found that most of the link removals affected a large number of ECs: 254 out of 381 links affected more that 1,000 ECs. The mean verification time to verify a link failure event was 1.15 seconds, with a maximum of 4.05 seconds. The verification layer can deal with such cases by processing the forwarding graphs of different ECs in parallel on multi-core processors. This is possible because the forwarding graphs do not depend on each other, or on any shared data structure. As link or node failures cannot be avoided once they happen, however, this may not be a serious issue for network operators.

In order to evaluate the verification layer's performance in the presence of more fields, the inventors changed the input data set to add packet filters that will selectively drop packets after matching them against multiple fields. The inventors randomly selected a subset of the existing RIB rules currently present in the network, and inserted packet filter rules by specifying values in some of the other fields that were not present in the original trace. This experiment was run with two sets of fields. Used in the first set was TP_SRC and TP_DST in addition to NW_DST (3 fields in total), which was already present in the trace. For each randomly selected RIB rule, the inventors set random values to those two fields (TP_SRC and TP_DST), and set its priority higher than the original rule. The remaining 11 fields were set to ANY. While replaying the updates, all the 14 fields except NW_DST are set to ANY.

Used in the second set were NW_SRC, IN_PORT, DL_VLAN, TP_SRC and TP_DST, in addition to NW_DST (6 fields in total). For each randomly selected RIB rule, the inventors set random values to IN_PORT, DL_VLAN, TP_SRC and TP_DST, a random/16 value in NW_SRC, and set the priority higher than the original rule. The remaining 8 fields were set to ANY. While replaying the updates, the 14 fields except NW_SRC and NW_DST are set to ANY. In the updates, the NW_SRC is set to a random/12 value and the NW_DST is the original value present in the trace. The inventors ran this experiment multiple times, varying the percentage of RIB rules that were used to generate random filter rules with higher priority.

Figure 3C:
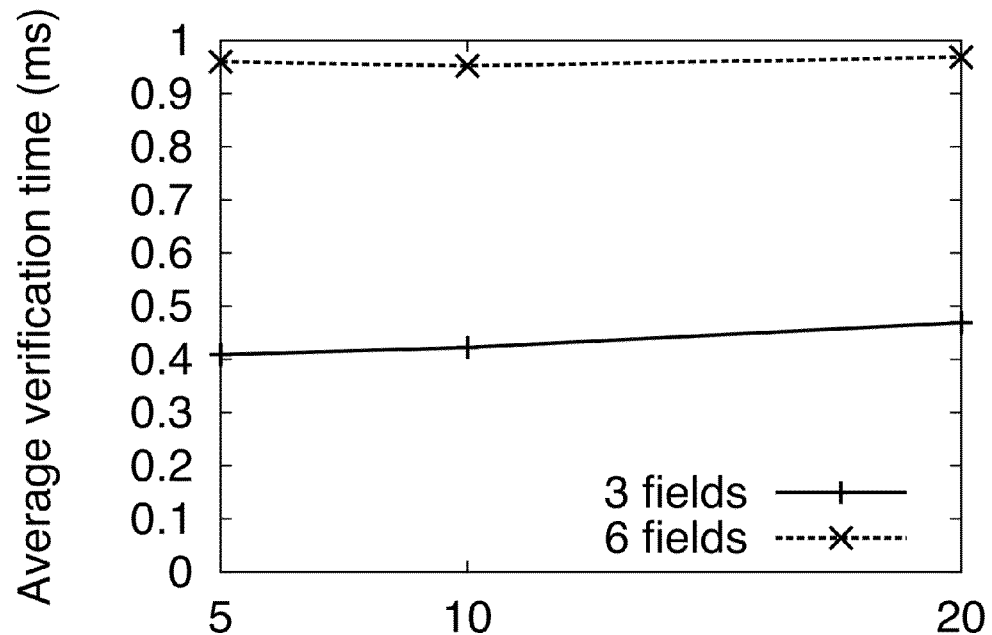

FIG. 3C shows the results of this experiment. The number of fields used to classify packets may heavily affect verification time. This happens because as more fields are used to classify packets at finer granularities, more unique ECs are generated, and hence more forwarding graphs need to be verified. Also note from FIG. 3C that the verification layer's overall performance may not be affected much by the number of filters that we install into the network.

In all experiments conducted thus far, the inventors kept a fixed order of packet header fields in the trie structure. The inventors started with DL_SRC (DS), followed by DL_DST (DD), NW_SRC (NS) and NW_DST (ND). In order to evaluate the performance of verification layer with different field orderings, the inventors re-ran the above packet filter experiment with reordered fields. Random values for the NW_SRC field were used and the NW_DST values present in the Route Views traces were used. All the other fields were set to ANY. The inventors installed random packet filter rules for 10% of the BGP RIB entries. As the dataset only specified values for the NW_SRC and NW_DST fields, there were a total of 12 different orderings of the aforementioned 4 fields. Table 1 shows the results from this experiment, showing the effect of different field ordering on total running time of the verification layer 100.

TABLE 1

| Order | Time (ms) |
|---|---|
| DS-DD-NS-ND | 1.001 |
| DS-NS-DD-ND | 1.057 |
| NS-DS-DD-ND | 1.144 |
| NS-DS-ND-DD | 1.213 |
| NS-ND-DS-DD | 1.254 |
| DS-NS-ND-DD | 1.116 |
| DS-DD-ND-NS | 0.090 |
| DS-ND-DD-NS | 0.096 |
| ND-DS-DD-NS | 0.101 |
| ND-DS-NS-DD | 0.103 |
| ND-NS-DS-DD | 0.15 |
| DS-ND-NS-DD | 0.098 |

From Table 1, one can observe that changing the field order in the trie structure may greatly influence the running time of the verification layer 100. Putting the NW_DST field ahead of NW_SRC reduced the running time by an order of magnitude (from around 1 ms to around 0.1 ms). It is difficult, however, to come up with a single field order that works best in all scenarios, because it is highly dependent on the type of rules present in a particular network.

Checking Non-Reachability Invariants:

Most of the present discussion thus far focused on checking invariants associated with the inter-reachability of network devices. To evaluate the generality of the verification layer tool, the inventors implemented two more invariants using the API that were not directly related to reachability: conflict detection (whether the newly inserted rule violates isolation of flow tables between network slices, accomplished by checking the output of the EC search phase), and k-monitoring (ensuring that all paths in the network traverse one of several deployed monitoring points, done by augmenting the forwarding graph traversal process). The inventors found that the overhead of these checks was minimal. For the conflict detection query, the inventors ran the above filtering experiment using the 6-field set with 10% and 20% newly inserted random rules. However, this time instead of checking the reachability of the affected ECs as each update is replayed, the verification layer computed the set of rules that overlap/conflict with the newly inserted rule. The results from this experiment are shown in FIG. 3D.

Figure 3D:
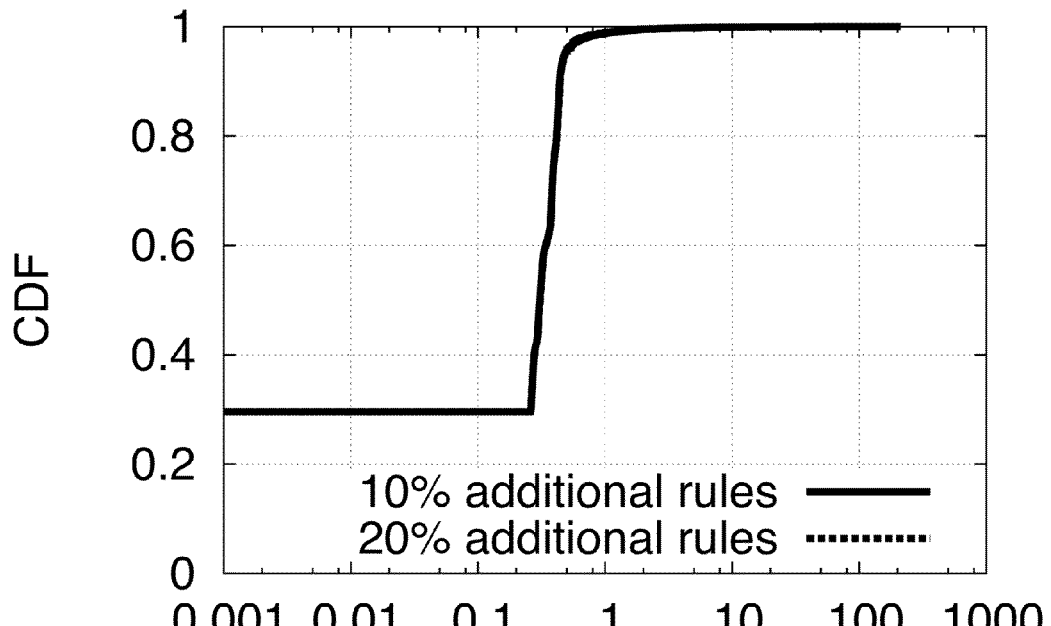

From FIG. 3D, one can observe that conflicting rule checking can be done quickly, taking only 0.305 ms on average. (The step in the CDF is due to the fact that some withdrawal rules did not overlap with any existing rule.)

For the k-monitoring query experiment, the inventors used a snapshot of the Stanford backbone network data-plane state. This network consists of 16 routers, where 14 of these are internal routers and the other 2 are gateway routers used to access the outside network. The snapshot contains 7,213 FIB table entries in total. In this experiment, we used the verification layer 100 to test whether all the ECs currently present in the network pass through one of the two gateway routers of the network. The inventors observed that at each location, the average latency to perform this check for all the ECs was around 68.06 ms with a maximum of 75.39 ms.

Second Experiment

In order to evaluate the effect of the verification layer's 100 operations on user-perceived TCP connection setup latency and the network throughput, the inventors emulated an OpenFlow network consisting of 172 switches following the aforementioned Rocketfuel topology using Mininet. Mininet creates a software-defined network (SDN) with multiple nodes on a single machine. The inventors connected one host to every switch in this emulated network. The inventors ran the NOX OpenFlow controller along with an application that provides the functionality of a learning switch. This allows a host to reach any other host in the network by installing flow rules in the switches using flow modification (Flow_Mod) messages.

The inventors implemented a simple TCP server program and a simple TCP client program to drive the experiment. The server program accepts TCP connections from clients and closes the connection immediately. The client program consists of two threads. The primary thread continuously sends connect requests to a random server using a non-blocking socket. To vary the intensity of the workload, the TCP client program generates connections periodically with a parameterized sleep interval (S). The primary thread at each client sleeps for a random interval between 0 to S seconds (at microsecond granularity) before initiating the connection request, and iterating. The secondary thread at each client uses the select function to look for connections that are ready for transmission or experienced an error. A user supplied polling interval (P) is used to control the rate at which the select call will return. The inventors set P inversely proportional to the S value to avoid busy waiting and to allow the other processes (e.g., Open vSwitch) to get a good share of the CPU. The inventors ran the server program at each of the 172 hosts, and configured the client programs at all the hosts to continually connect to the server of random hosts (excluding itself) over a particular duration (at least 10 minutes). In the switch application, we set the rule eviction idle timeout to 1 second and hard timeout to 5 seconds.

The inventors ran this experiment first with NOX alone, and then with NOX and the verification layer 100. The experiment used the same seed in all the random number generators to ensure similar loads in both the runs. The experiment also varied the S value to monitor the performance of the verification layer under a range of network loads.

Figure 4A:
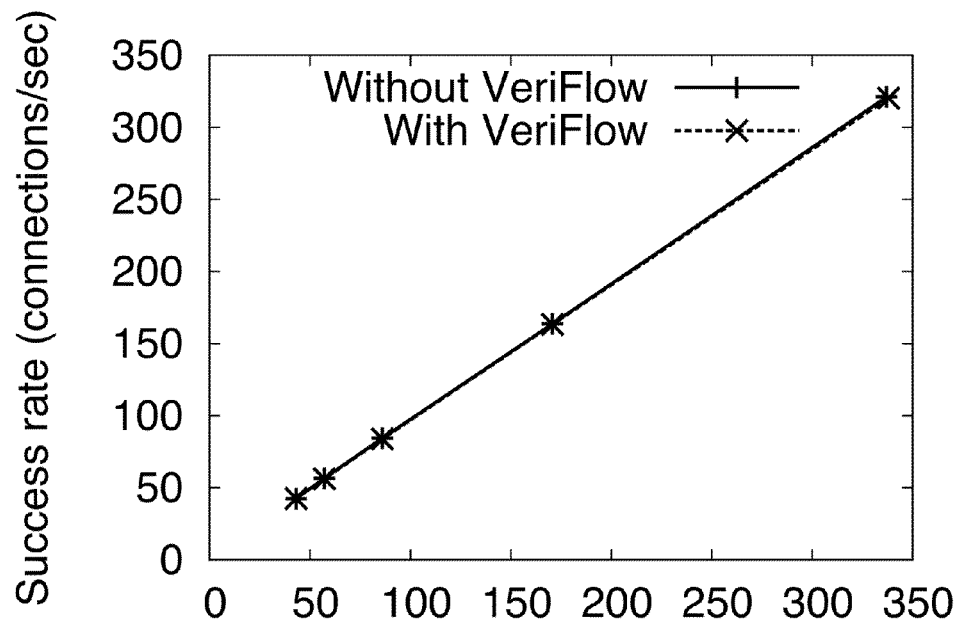
FIGS. 4A, 4B and 4C are graphs of experimental results from executing the data plane verification layer of FIGS. 1A and 1B under a range of network loads, respectively: (A) transport control protocol (TCP) connection setup throughput; (B) throughput of flow modification (Flow_Mod) messages, with and without the data plane verification layer; and (C) effect of the number of packet header fields on the data plane verification layer's verification speed.

FIG. 4A shows the number of TCP connections that were successfully completed per second for different workloads both with and without the verification layer 100. From FIG. 4A, one can observe that in all the cases the verification layer imposes negligible overhead on the TCP connection setup throughput in our emulated OpenFlow network. The largest reduction in throughput observed in our experiments was only 0.74%.

Figure 4B:
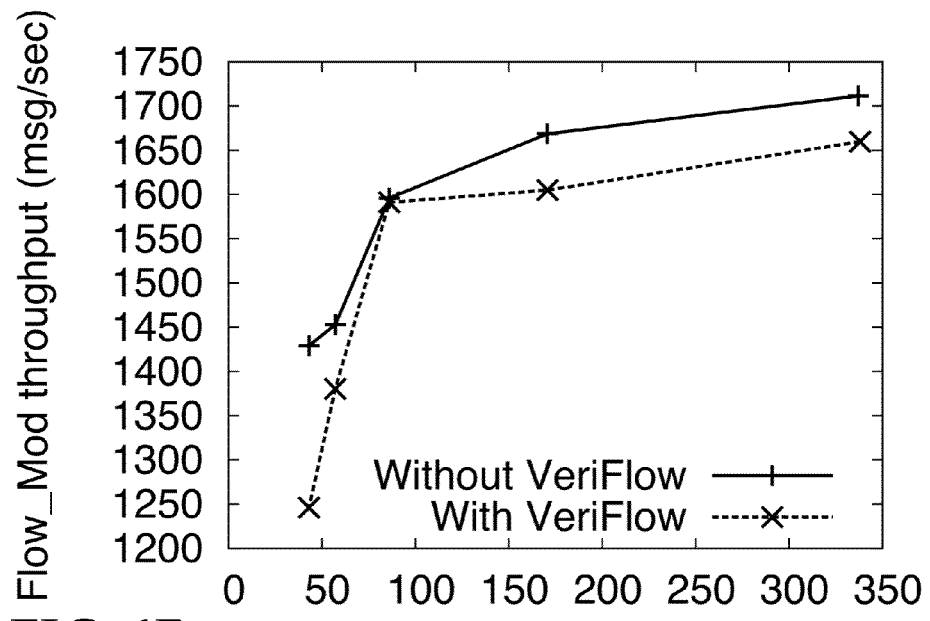

FIG. 4B shows the number of flow modification (Flow_Mod) messages that were processed and sent to the network per second for different workloads both with and without the verification layer. From FIG. 4, again one can observe that in all the cases the verification layer imposes overhead on the flow modification message throughput. The largest reduction in throughput observed in the experiments was only 12.8%. This reduction in throughput is caused by the additional processing time required to verify the flow modification messages before they are sent to the network.

In order to assess the impact of the verification on end-to-end TCP connection setup latency, this experiment was run with S set to 30 seconds. The inventors found that in the presence of the verification layer, the average TCP connection setup latency increases by 15.5% (45.58 ms without the verification layer compared to 52.63 ms with the verification layer). As setting up a TCP connection between two hosts in our emulated 172 host OpenFlow network requires installing flow rules into more than one switch, the verification performed by the verification layer after receiving each flow rule from the controller inflates the end-to-end connection setup latency to some extent.

Lastly, the inventors ran this experiment after modifying the verification layer to work with different numbers of OpenFlow packet header fields. Clearly, if one restricts the number of fields during the verification process, there will be less work for the verification layer, resulting in faster verification time. In this experiment, the inventors gradually increased the number of OpenFlow packet header fields that were used during the verification process (from 1 to 14). The verification layer simply ignored the excluded fields, and it reduced the number of dimensions in the trie structure. The inventors set 5 to 10 seconds and ran each run for 10 minutes. During the runs, the inventors measured the verification latency experienced by each flow modification message generated by NOX, and computed their average at each run.

Figure 4C:
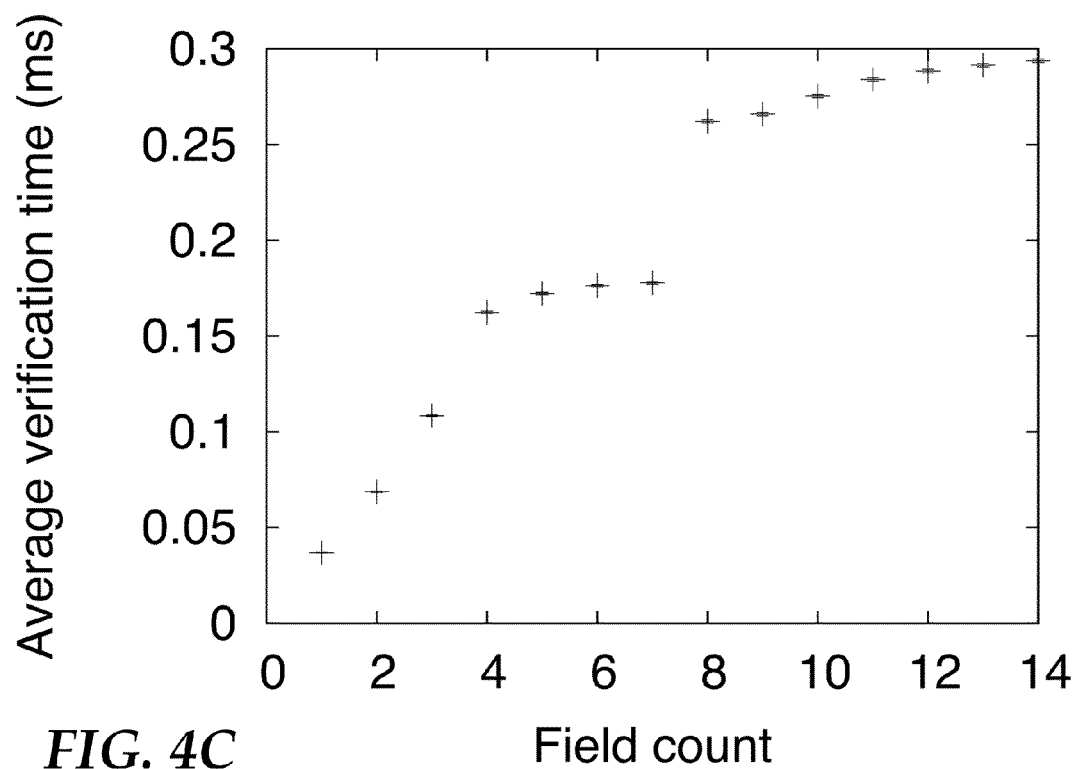

FIG. 4C shows the results from this experiment. Here, we see that with the increase in the number of packet header fields, the verification overhead of the verification layer increases gradually but always remains low enough to ensure real-time response. The five (5) fields that contributed most in the verification overhead are DL_SRC, DL_DST, NW_SRC, NW_DST and DL_TYPE. This happened because these five (5) fields had different values at different flow rules, and contributed most in the generation of multiple ECs. The other fields were mostly wildcards, and did not generate additional ECs.

Figure 5:
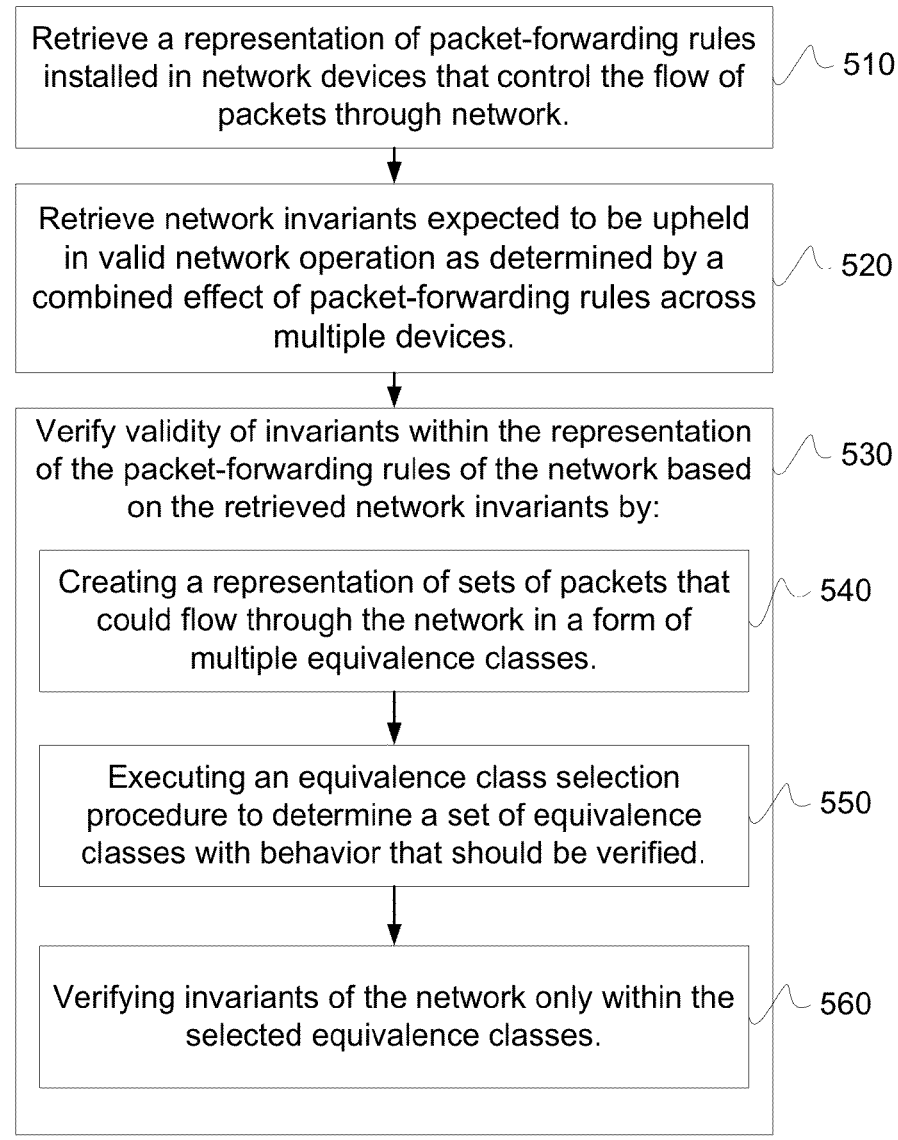
FIG. 5 is a flow chart of an exemplary method for network-wide verification of invariants.

FIG. 5 is a flow chart of an exemplary method for network-wide verification of invariants. The method includes retrieving from memory a representation of packet-forwarding rules installed in multiple network devices that control the flow of packets through a network (510). The method further includes retrieving from memory network invariants expected to be upheld in valid network operation as determined by a combined effect of the packet-forwarding rules executed across multiple network devices (520).

The method further includes verifying validity of invariants within the representation of the packet-forwarding rules of the network based on the retrieved network invariants (530). The verifying may include, but not be limited to: creating a representation of sets of packets that could be sent through the network, in the form of multiple equivalence classes, each equivalence class experiencing common forwarding actions within the network (540); executing an equivalence class selection procedure to determine a set of equivalence classes exhibiting behavior that should be verified (550); and verifying the invariants of the network only within the selected equivalence classes (560).

Figure 6:
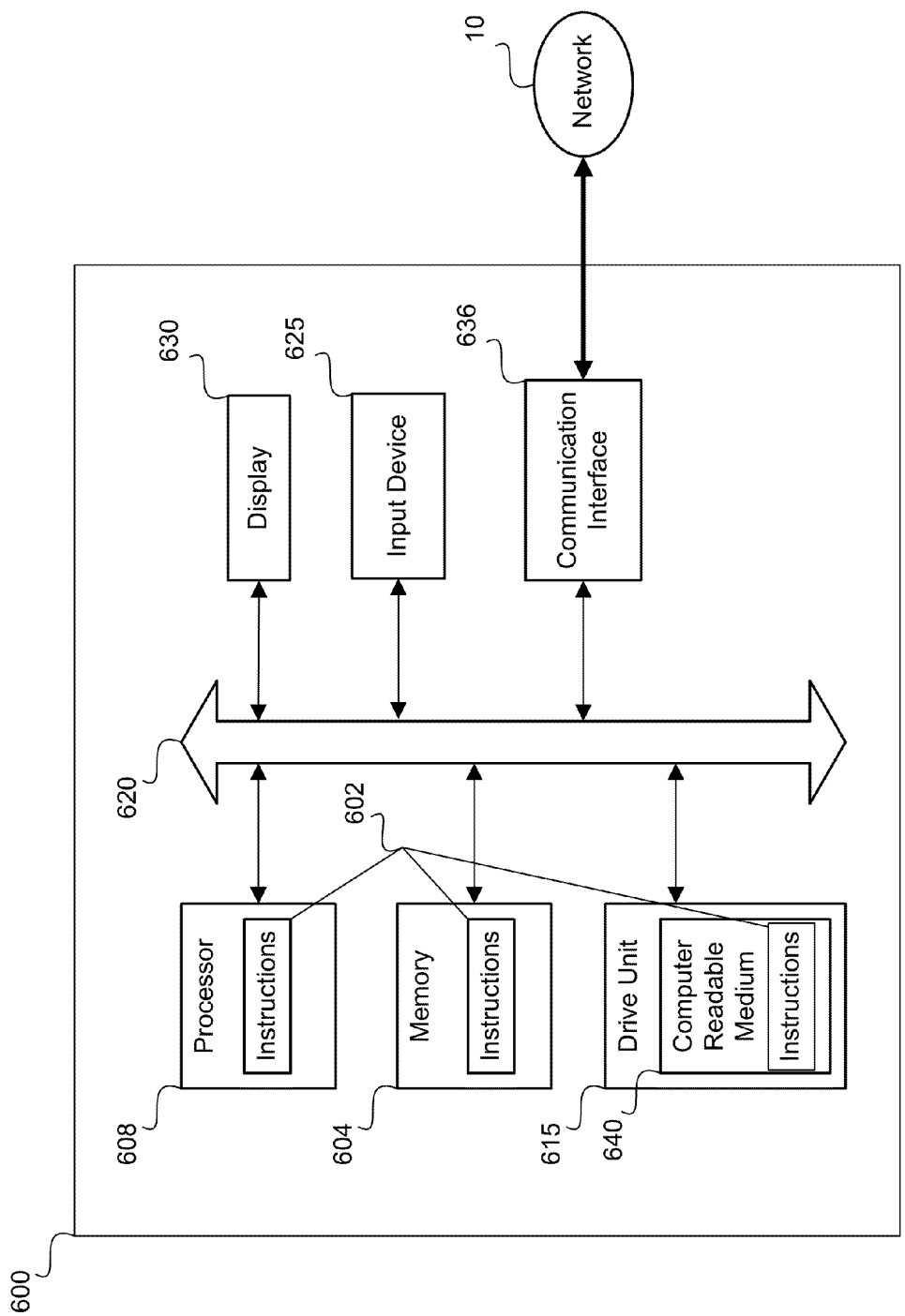
FIG. 6 illustrates a general computer system, which may represent any of the computing devices, or may be configured to execute any of the methods, referenced herein.

FIG. 6 illustrates a general computer system 600, which may represent the data plane verification layer 100, or any other computing devices referenced herein. The computer system 600 may include an ordered listing of a set of instructions 602 that may be executed to cause the computer system 600 to perform any one or more of the methods or computer-based functions disclosed herein. The computer system 600 may operate as a stand-alone device or may be connected to other computer systems or peripheral devices, e.g., by using the network 10.

In a networked deployment, the computer system 600 may operate in the capacity of a server or as a client-user computer in a server-client user network environment, or as a peer computer system in a peer-to-peer (or distributed) network environment. The computer system 600 may also be implemented as or incorporated into various devices, such as a personal computer or a mobile computing device capable of executing a set of instructions 602 that specify actions to be taken by that machine, including and not limited to, accessing the Internet or web through any form of browser. Further, each of the systems described may include any collection of sub-systems that individually or jointly execute a set, or multiple sets, of instructions to perform one or more computer functions.

The computer system 600 may include a memory 604 on a bus 620 for communicating information. Code operable to cause the computer system to perform any of the acts or operations described herein may be stored in the memory 604. The memory 604 may be a random-access memory, read-only memory, programmable memory, hard disk drive or any other type of volatile or non-volatile memory or storage device.

The computer system 600 may include a processor 608, such as a central processing unit (CPU) and/or a graphics processing unit (GPU). The processor 508 may include one or more general processors, digital signal processors, application specific integrated circuits, field programmable gate arrays, digital circuits, optical circuits, analog circuits, combinations thereof, or other now known or later-developed devices for analyzing and processing data. The processor 608 may implement the set of instructions 602 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 600 may also include a disk or optical drive unit 615. The disk drive unit 615 may include a computer-readable medium 640 in which one or more sets of instructions 602, e.g., software, can be embedded. Further, the instructions 602 may perform one or more of the operations as described herein. The instructions 602 may reside completely, or at least partially, within the memory 604 and/or within the processor 608 during execution by the computer system 600. Accordingly, the computer storage 118 for the network invariants described above in FIG. 1 may be stored in the memory 604 and/or the disk unit 615.

The memory 604 and the processor 608 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 600 may include an input device 625, such as a keyboard or mouse, configured for a user to interact with any of the components of system 600. It may further include a display 630, such as a liquid crystal display (LCD), a cathode ray tube (CRT), or any other display suitable for conveying information. The display 630 may act as an interface for the user to see the functioning of the processor 608, or specifically as an interface with the software stored in the memory 604 or the drive unit 615.

The computer system 600 may include a communication interface 636 such as the network device interface 14 that enables communications via the communications network 10. The network 10 may include wired networks, wireless networks, or combinations thereof. The communication interface 636 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A network-wide verification system comprising:
   a network device interface to read and write packet-forwarding rules of varied, multiple network devices comprising switches and routers of a network;
   a controller in network communication with the multiple network devices via the interface and to:
      obtain data comprising routing activity received from the multiple network devices of the network; and transmit packet-forwarding rules in real time to the network devices;

computer storage in which are stored multiple network invariants expected to be upheld in valid network operations as determined by a combined effect of packet-forwarding rules across multiple network devices; and a data plane verification layer positioned between the network device interface and the controller and comprising non-transitory computer-readable storage medium storing instructions that, when executed by at least one processing device, are to:

monitor packet-forwarding rule modifications in the network, including modifications initiated by the multiple network devices and by the controller; and verify validity of invariants of the network according to the stored multiple network invariants and the routing activity, to perform verification of the invariants on parts of the network capable of being influenced by a new rule modification.

2. The system of claim 1, where to monitor the network, the data plane verification layer is further to monitor forwarding-state change events comprising obtaining packet-forwarding rules sent to the network devices, where verification of the packet-forwarding rules occurs before the packet-forwarding rules reach the network devices.

3. The system of claim 1, where the network comprises a live network, and a modification may comprise added, changed, or deleted forwarding rules.

4. The system of claim 3, where to verify the validity of the invariants of the network, the data plane verification layer is further to:

classify packets sent through the network into multiple equivalence classes, each equivalence class representing a set of packets that experiences common forwarding actions within the network;

determine a set of equivalence classes that are affected by respective packet-forwarding rules; and verify the validity of the invariants of the network only within an equivalence class that is impacted by one or more packet-forwarding rule modifications, to generate an impacted equivalence class.

5. The system of claim 4, where the data plane verification layer is further to:

build a forwarding graph for the impacted equivalence class, the forwarding graph comprising a representation of how packets within the impacted equivalence class are forwarded through the network, as specified by the packet-forwarding rules; and verify the validity of one or more network invariants by analyzing how the set of packets flows through the forwarding graph.

6. The system of claim 5, where the data plane verification layer is further to:

store the packet-forwarding rules and the new rule modification in a multidimensional prefix tree (trie) data structure that enables fast storage and retrieval of rules matching a specified pattern;

determine a set of packet-forwarding rules in the trie that overlap with the new rule modification;

compute the impacted equivalence class based on the set of packet-forwarding rules;

determine movement of a set of packets through the network for the impacted equivalence class; and build a forwarding graph for the impacted equivalence class that incorporates the movement of the set of packets.

7. The system of claim 6, where the trie comprises dimensions, each dimension corresponding to a packet header field represented as a sub-trie;

where a path from a root of the trie to a leaf of the trie represents a particular set of packets, where a leaf of the trie stores a set of associated packet-forwarding rules; and where the data plane verification layer is further to traverse the trie, dimension by dimension, to find all existing packet-forwarding rules that intersect with the new rule modification.

8. The system of claim 7, where the data plane verification layer is further to traverse only branches of the trie that represent sets of packets that may be affected by the new rule modification.

9. The system of claim 5, where in response to a violated invariant, the data plane verification layer is further to take one or more customizable actions selected from the group consisting of:

(i) discarding a packet-forwarding rule that violates an invariant;

(ii) generating an alarm for a network operator;

(iii) logging events that occur to assist monitoring, auditing, or statistical analysis of network behavior; and (iv) executing a customized function or program configured as a parameter to the data plane verification layer.

10. The system of claim 5, further comprising:

an application programming interface (API) to facilitate execution of customized functions to verify invariants by providing interface functions which allow the customized functions to inspect contents of the forwarding graph, and incorporate the customized functions as modules executed by the data plane verification layer.

11. A method for network-wide verification of invariants, the method executable by a computer having a processor and memory, the method comprising:

positioning a data plane verification layer between a network device interface and multiple network devices;

retrieving from memory, using the processor, a representation of packet-forwarding rules installed in the multiple network devices that control a flow of packets through a network;

monitoring packet-forwarding rule modifications with the data plane verification layer, including monitoring modifications initiated by the multiple network devices;

retrieving from memory, using the processor, multiple network invariants expected to be upheld in valid network operation as determined by a combined effect of the packet-forwarding rules across the multiple network devices;

verifying, using the processor, validity of invariants within the representation of the packet-forwarding rules based on the multiple network invariants, comprising:

creating a representation of sets of packets that could be sent through the network in a form of multiple equivalence classes, each equivalence class experiencing common forwarding actions within the network;

executing an equivalence class selection procedure to determine a set of equivalence classes exhibiting behavior that should be verified by selecting a plurality of equivalence classes affected by a packet-forwarding rule modification; and verifying, by the data plane verification layer, the invariants of the network only within the plurality of equivalence classes.

12. The method of claim 11, further comprising:
wherein positioning the data plane verification layer further comprises positioning the data plane verification layer between the network device interface and a controller in network communication with the multiple network devices via the network device interface, where the controller is to transmit packet-forwarding rules to the multiple network devices.

13. The method of claim 11, where monitoring further comprises:
monitoring forwarding-state change events by obtaining packet-forwarding rules sent to the network devices, where verification of the packet-forwarding rules occurs before the packet-forwarding rules reach the network devices; and
allowing network devices to install the packet-forwarding rules after the data plane verification layer verifies corresponding invariants are upheld.

14. The method of claim 11, further comprising:
retrieving a representation of the network and of the packet-forwarding rules of the multiple network devices;
storing the representation in the memory; and
executing network-wide verification on the representation of the packet-forwarding rules, where the equivalence class selection procedure selects (i) all within the set of equivalence classes or (ii) a subset of the set of equivalence classes, as specified by a configurable parameter.

15. The method of claim 11, further comprising:
building a forwarding graph for each selected equivalence class, the forwarding graph comprising a representation of how packets within respective equivalence classes are forwarded through the network; and
verifying validity of one or more network invariants by analyzing the forwarding graphs to determine whether packet flows allowed by the forwarding graphs conform to the invariants.

16. The method of claim 15, further comprising, in response to a violated invariant, performing one or more customizable actions selected from the group consisting of:
(i) discarding a packet-forwarding rule that violates an invariant;
(ii) generating an alarm for a network operator;
(iii) logging events that occur to assist monitoring, auditing, or statistical analysis of network behavior; and
(iv) executing a customized function or program configured as a parameter to the data plane verification layer.

17. The method of claim 15, further comprising:
storing the packet-forwarding rules in a multidimensional prefix tree (trie) data structure that enables fast storage and retrieval of rules matching a specified pattern;
determining a set of packet-forwarding rules in the trie that overlap with a set of packets that are relevant to the equivalence class selection procedure;
computing the selected equivalence classes based on the set of packet-forwarding rules obtained from the trie;
determining movement of a set of packets through the network for the selected equivalence classes; and
building one or more forwarding graphs for the selected equivalence classes that incorporate the movement of the set of packets.

18. The method of claim 17,
where the trie comprises dimensions, each dimension corresponding to a packet header field represented as a sub-trie;
where a path from a root of the trie to a leaf of the trie represents a particular set of packets, where a leaf of the trie stores a set of associated packet-forwarding rules; and
where the data plane verification layer is further configured to traverse the trie, dimension by dimension, to find all existing packet-forwarding rules that intersect with the selected equivalence classes.

19. The method of claim 18, further comprising:
traversing only branches of the trie that represent sets of packets within the selected equivalence classes.

20. A non-transitory computer-readable storage medium comprising a set of instructions to implement a data plane verification layer for network-wide verification of invariants by a computing device having a processor and memory, the computer readable medium comprising:
instructions to direct the processor to obtain data comprising routing activity sent to a network controller by multiple network devices of a network;
instructions to direct the processor to obtain packet-forwarding rules issued by a controller, where the controller is in network communication with the multiple network devices and configured to transmit the packet-forwarding rules to the multiple network devices;
instructions to direct the processor to monitor packet-forwarding rule modifications in a network, including modifications initiated by the multiple network devices and by the controller;
instructions to direct the processor to retrieve, from the memory, network invariants expected to be upheld by valid network operations as determined by a combined effect of packet-forwarding rules across the multiple network devices, to generate retrieved network invariants; and
instructions to direct the processor to verify validity of invariants of the network according to the retrieved network invariants, where the verification is executed on parts of the network that take actions capable of being influenced by a new rule modification.

21. The computer-readable storage medium of claim 20, where the network comprises a live network and the instructions operable to monitor the packet-forwarding rule modifications are adapted to monitor the network in real time, further comprising:
instructions to direct the processor to monitor forwarding-state change events by obtaining packet-forwarding rules sent to the network devices, where verification of the packet-forwarding rules occurs before the packet-forwarding rules reach the network devices.

22. The computer-readable storage medium of claim 20, further comprising instructions to direct the processor to:
classify packets sent through the network into multiple equivalence classes, each equivalence class representing a set of packets which experience common forwarding actions within the network;
determine a set of equivalence classes that are affected by respective packet-forwarding rules; and
verify the validity of the network invariants only within an equivalence class that is impacted by one or more packet-forwarding rule modifications, to generate an impacted equivalence class.

23. The computer-readable storage medium of claim 22, further comprising instructions to direct the processor to:
build a forwarding graph for the impacted equivalence class, the forwarding graph comprising a representation of how packets within the impacted equivalence class are forwarded through the network; and verify validity of one or more network invariants by analyzing possible packet flows through the forwarding graph.

24. The computer-readable storage medium of claim 20, where in response to a violated invariant, further comprising instructions to direct the processor to execute one or more customizable actions selected from the group consisting of:
(i) discarding a packet-forwarding rule that violates an invariant;
(ii) generating an alarm for a network operator;
(iii) logging events that occur to assist monitoring, auditing, or statistical analysis of network behavior; and
(iv) executing a customized function or program configured as a parameter to the data plane verification layer.

25. A method comprising:
obtaining, using at least one processing device executing instructions of a data plane verification layer, data comprising routing activity sent to a network controller by multiple network devices of a network;
obtaining, using the at least one processing device, packet-forwarding rules issued by a controller, where the controller is in network communication with the multiple network devices and configured to transmit the packet-forwarding rules to the multiple network devices;
monitoring, using the at least one processing device, packet-forwarding rule modifications in a network, including modifications initiated by the multiple network devices and by the controller;
retrieving, from computer-readable memory, network invariants expected to be upheld by valid network operations as determined by a combined effect of packet-forwarding rules across the multiple network devices, to generate retrieved network invariants; and
verifying, using the at least one processing device, validity of invariants of the network according to the retrieved network invariants, where the verification is executed on parts of the network that take actions capable of being influenced by a new rule modification.

* * * * *